(12) United States Patent
Shotton, Jr. et al.

(10) Patent No.: US 7,313,588 B1
(45) Date of Patent: Dec. 25, 2007

(54) LOCALLY EXECUTING SOFTWARE AGENT FOR RETRIEVING REMOTE CONTENT AND METHOD FOR CREATION AND USE OF THE AGENT

(75) Inventors: Charles T. Shotton, Jr., Leesburg, VA (US); Louis P. Slothouber, Leesburg, VA (US); M. Ellen Dudar, Purcellville, VA (US)

(73) Assignee: BIAP Systems, Inc., Sterling, VA (US)

( * ) Notice: Subject to any disclaimer, the term of this patent is extended or adjusted under 35 U.S.C. 154(b) by 1325 days.

(21) Appl. No.: 09/615,830

(22) Filed: Jul. 13, 2000

(51) Int. Cl.
- G06F 15/16 (2006.01)
- G06F 9/54 (2006.01)
- G06F 9/44 (2006.01)

(52) U.S. Cl. ..................... 709/202; 719/317
(58) Field of Classification Search ............... 719/317, 719/500–978; 709/202
See application file for complete search history.

(56) References Cited

U.S. PATENT DOCUMENTS

| | | | |
|---|---|---|---|
| 5,339,392 A * | 8/1994 | Risberg et al. ............. 715/762 |
| 5,416,917 A | 5/1995 | Adair et al. | |
| 5,587,902 A | 12/1996 | Kugimiya | |
| 5,623,653 A * | 4/1997 | Matsuno et al. ............ 707/200 |
| 5,649,186 A | 7/1997 | Ferguson | |
| 5,710,918 A | 1/1998 | Lagarde et al. | |
| 5,721,908 A | 2/1998 | Lagarde et al. | |
| 5,727,159 A | 3/1998 | Kikinis | |
| 5,761,673 A * | 6/1998 | Bookman et al. ........... 719/311 |
| 5,768,528 A | 6/1998 | Stumm | |
| 5,826,258 A | 10/1998 | Gupta et al. | |
| 5,864,863 A | 1/1999 | Burrows | |
| 5,898,836 A * | 4/1999 | Freivald et al. ............. 709/218 |
| 5,963,937 A | 10/1999 | Yamasaki et al. | |
| 5,974,441 A | 10/1999 | Rogers et al. | |
| 5,978,828 A * | 11/1999 | Greer et al. ................ 709/224 |
| 5,978,842 A * | 11/1999 | Noble et al. ................ 709/218 |
| 5,983,200 A | 11/1999 | Slotznick | |

(Continued)

FOREIGN PATENT DOCUMENTS

EP   0774722   5/1997

(Continued)

OTHER PUBLICATIONS

Douglis, Fred et al. "Tracking and Viewing Changes on the Web" USENIX Technical Conference. 1996.*

(Continued)

*Primary Examiner*—Lewis A. Bullock, Jr.
(74) *Attorney, Agent, or Firm*—Hunton & Williams LLP (57) ABSTRACT

A software agent is provided which executes instructions on a local user's computer to retrieve potentially changing information content from remote target sources, including web pages, over a computer network, such as the Internet. Different types of software agents are available to retrieve different types of information content from remote sites. Agent types include a smart agent, a search agent, a custom agent for detailed tasks and an RSS agent for retrieving structured XML format documents from remote Internet sites. Information retrieved by the agents is formatted and stored locally for presentation in a publication on the local computer. Publication templates can display target content retrieved by multiple agents from many different remote target pages.

24 Claims, 6 Drawing Sheets

U.S. PATENT DOCUMENTS

| | | | |
|---|---|---|---|
| 5,983,267 | A | 11/1999 | Shklar et al. |
| 5,987,403 | A | 11/1999 | Sugimura |
| 5,996,000 | A | 11/1999 | Shuster |
| 6,012,083 | A | 1/2000 | Savaitzky et al. |
| 6,021,426 | A * | 2/2000 | Douglis et al. ............. 709/200 |
| 6,023,697 | A | 2/2000 | Bates et al. |
| 6,029,175 | A * | 2/2000 | Chow et al. ............. 707/104.1 |
| 6,067,541 | A * | 5/2000 | Raju et al. ..................... 707/3 |
| 6,067,559 | A | 5/2000 | Allard et al. |
| 6,070,185 | A | 5/2000 | Anupam et al. |
| 6,085,186 | A | 7/2000 | Christianson et al. |
| 6,085,193 | A | 7/2000 | Malkin et al. |
| 6,088,731 | A | 7/2000 | Kiraly et al. |
| 6,092,099 | A | 7/2000 | Irie et al. |
| 6,094,662 | A * | 7/2000 | Hawes .................... 707/104.1 |
| 6,108,686 | A | 8/2000 | Williams, Jr. |
| 6,195,608 | B1 * | 2/2001 | Berliner et al. ............. 701/118 |
| 6,199,097 | B1 | 3/2001 | Hachiya et al. |
| 6,205,456 | B1 | 3/2001 | Nakao |
| 6,209,007 | B1 * | 3/2001 | Kelley et al. ............... 715/513 |
| 6,226,642 | B1 * | 5/2001 | Beranek et al. ............... 707/10 |
| 6,242,966 | B1 * | 6/2001 | Shiotsuka ................... 327/362 |
| 6,253,239 | B1 * | 6/2001 | Shklar et al. ............... 709/217 |
| 6,324,565 | B1 * | 11/2001 | Holt, III ..................... 709/203 |
| 6,339,775 | B1 | 1/2002 | Zamanian et al. |
| 6,366,933 | B1 * | 4/2002 | Ball et al. ................... 715/511 |
| 6,535,896 | B2 * | 3/2003 | Britton et al. ............... 715/523 |
| 6,567,816 | B1 | 5/2003 | Desai et al. |
| 6,605,120 | B1 * | 8/2003 | Fields et al. ................ 715/513 |
| 6,606,525 | B1 * | 8/2003 | Muthuswamy et al. ....... 700/52 |
| 6,681,369 | B2 * | 1/2004 | Meunier et al. ............ 715/511 |
| 6,738,804 | B1 * | 5/2004 | Lo .............................. 709/219 |
| 6,826,594 | B1 * | 11/2004 | Pettersen ................... 709/203 |
| 6,836,774 | B2 * | 12/2004 | Melbin ........................ 707/10 |
| 6,897,217 | B2 * | 5/2005 | Neustadt et al. ........ 514/252.16 |
| 6,988,135 | B2 * | 1/2006 | Martin et al. ............... 709/224 |
| 7,000,008 | B2 * | 2/2006 | Bautista-Lloyd et al. ... 709/219 |
| 2002/0004813 | A1 * | 1/2002 | Agrawal et al. ............ 709/201 |

FOREIGN PATENT DOCUMENTS

GB        2329309 A  *  3/1999

OTHER PUBLICATIONS

Chen, Yih-Farn et al. "TopBlend: An Efficient Implementation of HtmlDiff in Java," AACE. 2000.*

Saeyor, Santi et al. "WebBeholder: A Revolution in Tracking and Viewing Changes on the Web by Agent Community." Nov. 1998.*

Saeyor, Santi et al. "WebBeholder: A Source of Community Interests and Trends based on Cooperative Change Monitoring Service on the Web," IEEE. 2000.*

Douglis, Fred et al. "The AT&T Internet Difference Engine: Tracking and Viewing Changes on the Web," Jan. 1998.*

Ashish, N., et al.; "Semi-automatic Wrapper Generation for Internet Information Sources"; Cooperative Informtion Systems, 160-169; (1997).

Liu, Ling, et al.; "XWRAP: An XML-enabled Wrapper Construction System for Web Information Sources", Data Engineering, Proceedings, 16th International Conference on San Diego, CA, vol. 29, pp. 611-621 (2000).

Hsieh-Chang, T., et al.; "An Architecture and Category Knowledge for Intelligent Information Retrieval Agents", System Sciences, pp. 405-413, (1998).

Kent, C., et al., "Creating a web analysis and visualization environment", Computer Networks and ISDN Systems, pp. 109-117, vol. 28, No. 1, (1995).

Declaration of Charles T. Shotton, Jr., Civ. Action No. 00 906 1, E. D. Va., filed Jun. 1, 2001.

* cited by examiner

LOCALLY EXECUTING SOFTWARE AGENT
FOR RETRIEVING REMOTE CONTENT
AND METHOD FOR CREATION AND USE
OF THE AGENT

FIELD AND BACKGROUND OF THE
INVENTION

The present invention relates generally to the field of programmed software agents and in particular to a new and useful software agent for retrieving changing information from predetermined networked web sites.

There are many different types of networks presently known and existing. Local area networks (LANs) and wide area networks (WANS) are typically internal to an organization. These networks are usually isolated from outside users or other networks, but may be interconnected. The Internet is a large global network of interconnected computers.

A particular computer or a file containing information on such a computer may be found through an "address" or URL (uniform resource locator). Any computer which is connected to a network, and especially, the Internet, must have an address which identifies it to the other computers on the network.

Computers which are permanently connected to a network may have files identified by specific URLs which can be accessed by other, remote computer users also connected to the network. When the files contain text and graphics in HTML (Hypertext Markup Language) or similar languages, these files are often referred to as "web pages". Web pages can be viewed by different users with a software application known as a web browser, such as Netscape's NAVIGATOR browser or Microsoft's INTERNET EXPLORER browser. Each web page that is stored on one of these networked computers has a distinctive URL which can consistently be used to locate the web page and its current content for display in a browser application window.

Web page files which are in HTML or a similar language contain formatting and presentation instructions that can be used by a remote user's web browser to display the content of the web page on their local computer. The text and graphics on the web page that the remote user actually sees are typically referred to as "content".

In recent years, the Internet computer network has become increasingly commercial and continues to grow in size at a rapid rate. It is possible to find massive amounts of information on trivial subjects in a short period of time using the Internet. However, due to the commercial nature of some sites, advertising has become a major portion of many web sites. On some web pages, the amount of advertising can dwarf the information content of the page. Other pages contain so much information, it is difficult for a user to discern which information is most relevant to him.

The formatting of web pages using HTML and related languages divides content into particular sections, or structures. Often, only one or two of the structures of a particular web page will contain useful information content. The remainder of the page may be advertising or irrelevant information.

Search engines exist to help users find information content on web pages by indexing the pages of owners who register with the search engine against the terms which appear in their web pages. When a user accesses a search engine, the terms entered into the search engine are compared to the previously indexed terms and a listing of hyperlinks to potentially relevant sites is presented to the user. The listing of hyperlinks is generated based on the search engines best guess of which sites are most relevant using a weighting of the search terms. A search engine is not an exceptionally accurate way to find information. But, when a source location is not known, it provides a good starting point.

Agent software, sometimes referred to as "intelligent agents", "robots", "bots" or "spiders" is generally known in the art of computers. The term intelligent agent can be used to mean a broad range of software programs having pre-programmed logic for performing particular functions. The particular functions, programming and purpose vary from agent to agent. Most software referred to as intelligent agents operates on many different computers across a network. That is, the agent functions are distributed and require the cooperation of at least two computers.

Agents may be used to perform commercial transactions, such as the intelligent agent disclosed by U.S. Pat. No. 5,983,200. The agent is used to execute tasks electronically using given information and learned information. The agent quickly performs actions across a network which would otherwise be very time-consuming for the user who enabled the agent.

Software agents which can be programmed to perform particular functions are thus very useful and have many different applications.

Agent software executing on a user's personal computer which can retrieve, format and display content from many different remote sources to the user's local personal computer is not presently known.

SUMMARY OF THE INVENTION

It is therefore an object of the present invention to provide a search agent software for retrieving a changing information from known remote computer locations.

It is a further object of the invention to provide a software agent which executes on a local computer to retrieve information from remote data sources.

Yet another object of the invention is to provide a software agent that can recognize retrieved content formats for storage and publication purposes.

Accordingly, a software agent is provided which executes instructions on a local user's computer to retrieve potentially changing information content from remote data sources over a computer network, such as the Internet. Different types of software agents are available to retrieve different types of information content from remote sites.

The agent has pre-programmed agent information which the agent uses in conjunction with agent tools and routine libraries to find and identify desired information content. The agent information includes the URL of a remote web page, called the target web page, containing the desired information content, called the target content. The agent retrieves the target web page identified by the programmed. URL to the local computer. The agent parses the target web page using pre-programmed agent information to identify target content structures in the target web page.

Target content can be found by the agent, even if the specific information content changes, and in certain cases, even if the position of the target content changes within the target web page. The agent tools include algorithms for searching the target web site for the web page structure containing the target content, even when the target web site has changed form.

Once the target content is found in the retrieved web page, the target content is saved by the agent in a known structure with some formatting information from the original target web page.

A method for creating the agent involves specifying the type of agent, and supplying agent information including identifying the agent with a name and brief description, identifying the URL of a target web page, identifying start marker text, and identifying end marker text, followed by generating the agent programming using the target URL, agent information and the agent tools and routine libraries. After generating the agent, the accuracy of the agent can be verified by running the agent to ensure it retrieves the target content from the specified section of the target web page The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The agent software of the invention is particularly advantageous for use since it is stored on and executes on a local computer where the user of the agent software is located. Execution of agent routines on other computers is not required for the agent to function; the agent software only requires access to the information stored on remote computers to perform its functions. The agent of the invention can be used to create a personal Internet portal for a individual user by retrieving, formatting and storing content from one or more specific remote locations. The stored content can then be put into a personal publication presenting the content from many different remote locations on a single, local page.

The creation and use of the agent software will now be described in greater detail.

Figure 1:
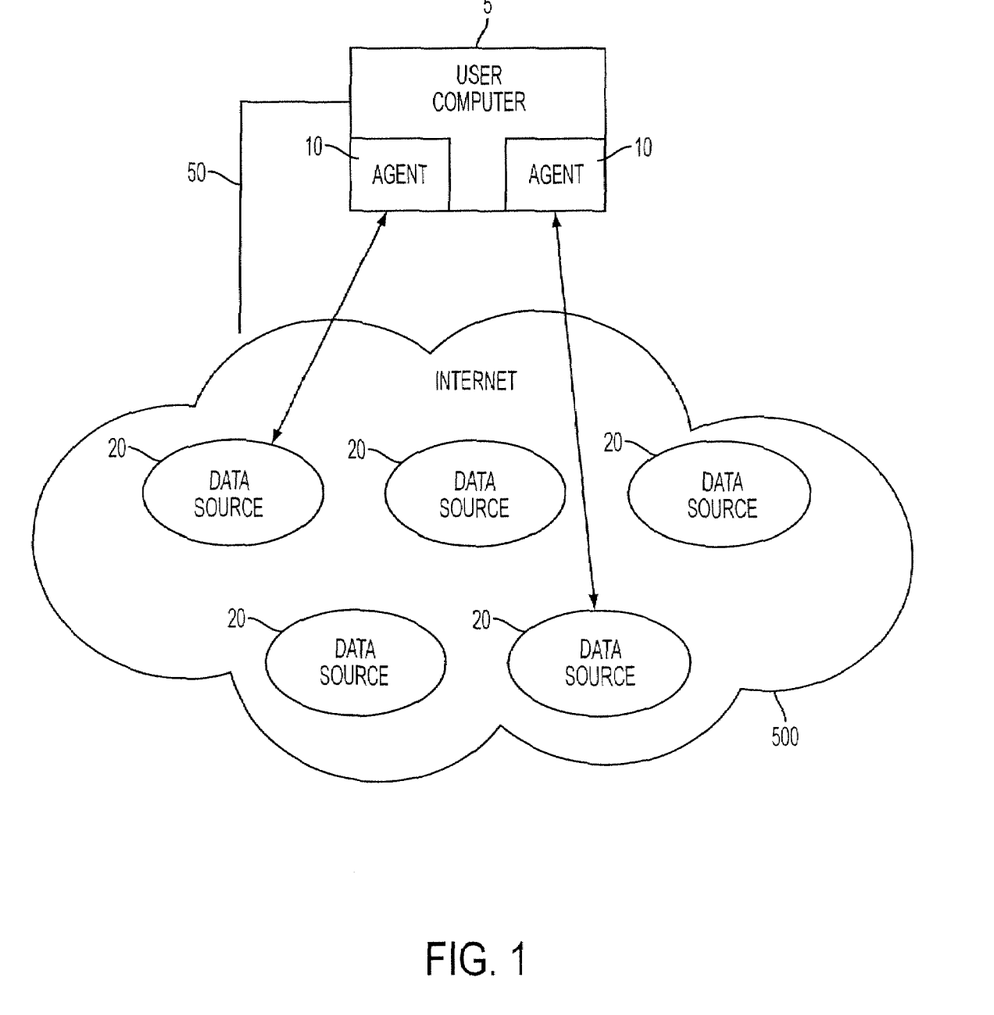
FIG. 1 is a schematic diagram showing the relationship between a local user of the agent and a network of data sources.

Referring now to the drawings, in which like reference numerals are used to refer to the same or similar elements, FIG. 1 shows the environment in which the software agent 10 operates. A user's local computer 5 having one or more software agents 10 of the invention loaded and operating on the local computer 5. The local computer may be an Apple MAC, an IBM-PC type, one using UNIX or LINUX operating systems, PALM PILOT, or another computer capable of displaying graphical or text content to a single user. The local computer 5 is connected to a computer network 500, such as the Internet, via any known connection 50, including local area network (LAN) CAT5 wiring, dial-up telephone, digital subscriber line (DSL), T1 lines, and cable modem, among others.

The computer network 500 includes multiple data sources 20. Each data source 20 has a unique URL, called a target source or target web page, which can be accessed by the agent software 10 and contains desired information content, called target content. The possible forms for the target source are not limited to traditional web pages, and include HTML documents, XML documents, text files, graphic files, mail messages, database files and other similar types of computer files. Each agent 10 includes a link to a single data source 20. The data sources 20 could be accessed by a conventional web browser and the information content is in a format readable by the conventional web browser.

The agent software 10 resides entirely on the user's computer 5 and, when activated, downloads the target web page located at a specified URL of the data sources 20. Many agents 10 can operate on a single user's computer to retrieve target content from many different target web pages.

Agent Structure

Figure 2:
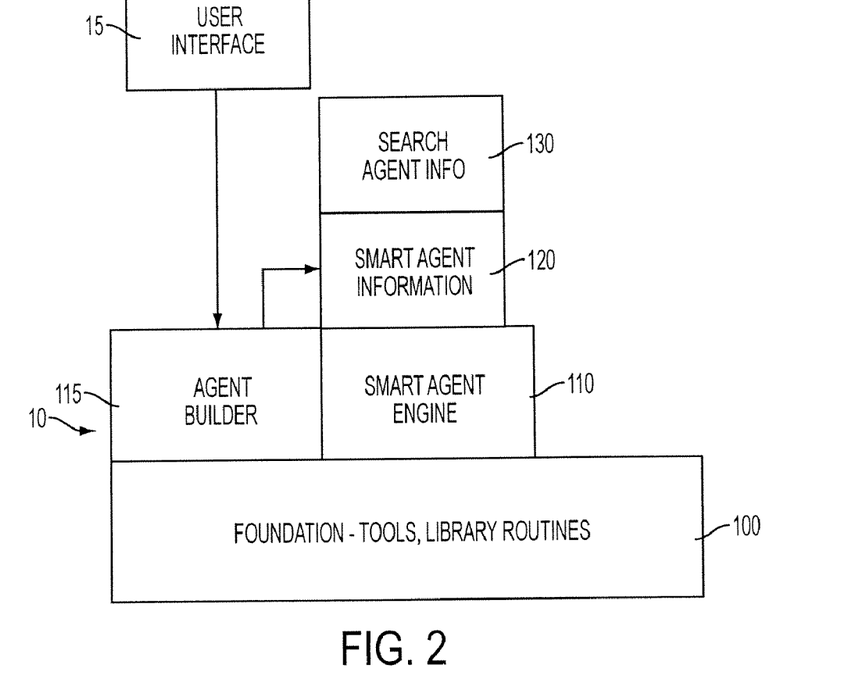
FIG. 2 is a graphical depiction of the architecture of a software agent of the invention.
Figure 2A:
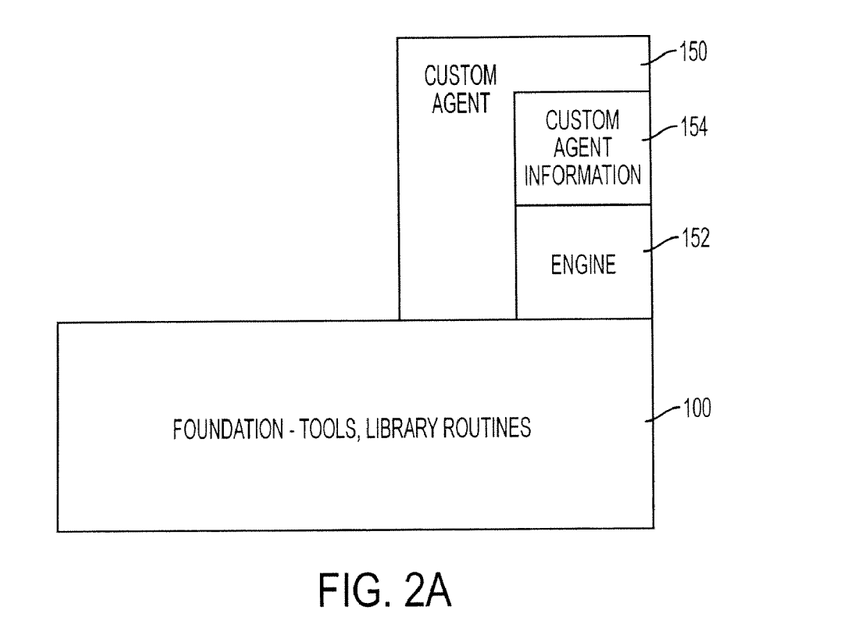
FIG. 2A is a graphical depiction of a the architecture of a custom agent.
Figure 3:
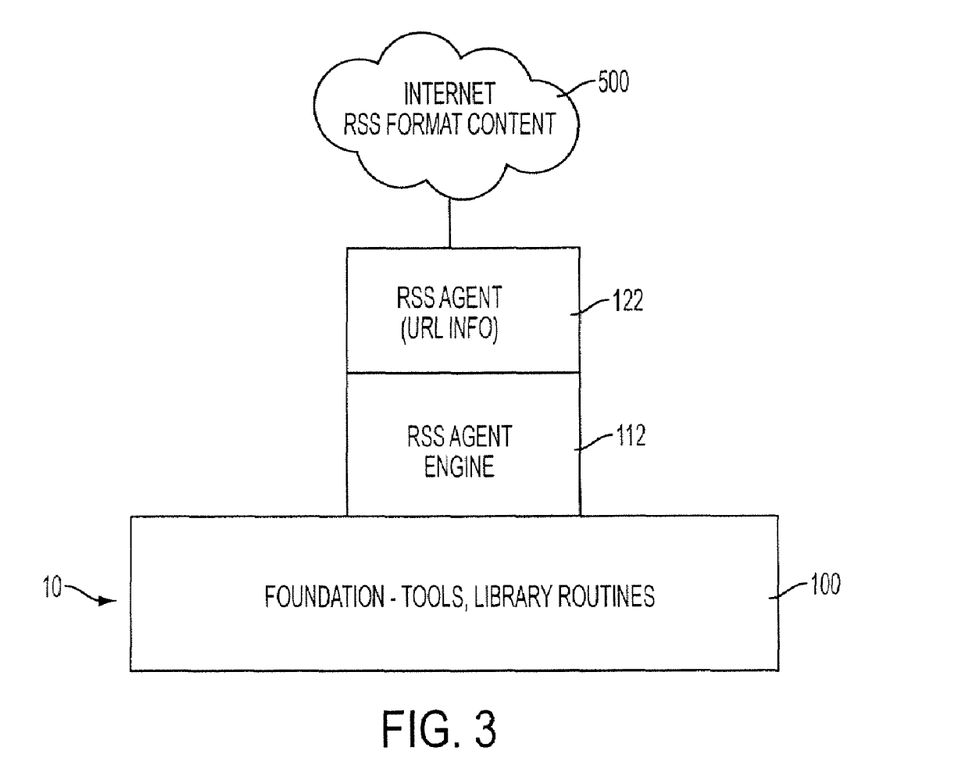
FIG. 3 is a graphical depiction of the architecture of an RSS-type agent.

FIGS. 2, 2A and 3 illustrate the structure of three primary types of the software agent 10.

FIG. 2 shows the general architecture of an agent 10 which can ultimately be one of two related types: a smart agent and a search agent. The drawing illustrates the specificity of the different parts of the agent 10 with general programming at the bottom and specific instructions at the top of the diagram.

Instructions which distinguish the current agent 10 from other agents are input to an agent builder program 115 using the user interface 15 of computer 5. The agent builder program 115 converts the input instructions into smart agent information 120. The smart agent information 120 is essentially data with parameters that can be used by the other agent software modules.

All agents 10 include a foundation 100. The foundation 100 has various agent tool and library routines used by the agent 10 to perform its functions. Tools and library routines may include a function to request and retrieve a target web site from a URL specified by the smart agent information 120, checking algorithms for verifying the accuracy of an agent and other common programming routines that can be combined to produce larger program functions. The foundation 100 further includes communications protocols and HTML and RSS parsing routines, as described in more detail below.

The smart agent engine 110 uses the foundation 100 elements to produce program instructions for the agent 10 based on the smart agent information 120. The smart agent engine 110 includes a predefined process for applying the tools and library routines to the problem presented by the smart agent information 120. A smart agent is the basic agent of the agent software 10.

A search agent includes the search agent information 130. The search agent information 130 adds a place holder to the smart agent information 120 for entering search terms or other information, such as a username/password combination. The search agent may be used to retrieve search results from a known remote site (the target web site) offering indexed, searchable information, among other things. The search agent information 130 causes additional instructions to be added to the program created by the smart agent engine 110.

A custom agent module 150, as shown in FIG. 2A, interacts directly with and is built on the foundation 100. The custom agent module 150 includes an engine 152 for building and operating a program process using the foundation elements. Custom agent information 154 is used to generate the agent 10 programming. Custom agent modules 150 incorporate specialized functions which cannot be enabled using the basic smart agent engine 110.

An RSS-type agent 10 is shown in FIG. 3. Some sites on the Internet contain information in a: format known as RSS, which is a specific structured form of XML. The RSS format is very specific and all data in RSS format always has the same structure. Another similar format is known as RDF.

An RSS-type agent is a simplified version of the smart agent of FIG. 2 described above. The RSS-type agent 10 can be used to retrieve any content which is stored in a predetermined, known structure, like RSS or RDF.

The RSS type agent 10 includes the foundation 100 like a smart agent, but the RSS agent engine 112 and RSS agent information 122 are simplified. The RSS agent information 122 consists simply of the URL location of the desired RSS format data to be retrieved. The RSS agent engine 112 contains program instructions designed to specifically retrieve and store content in RSS format that is modified only by the URL location in the RSS agent information 122.

Agent Creation

Figure 4:
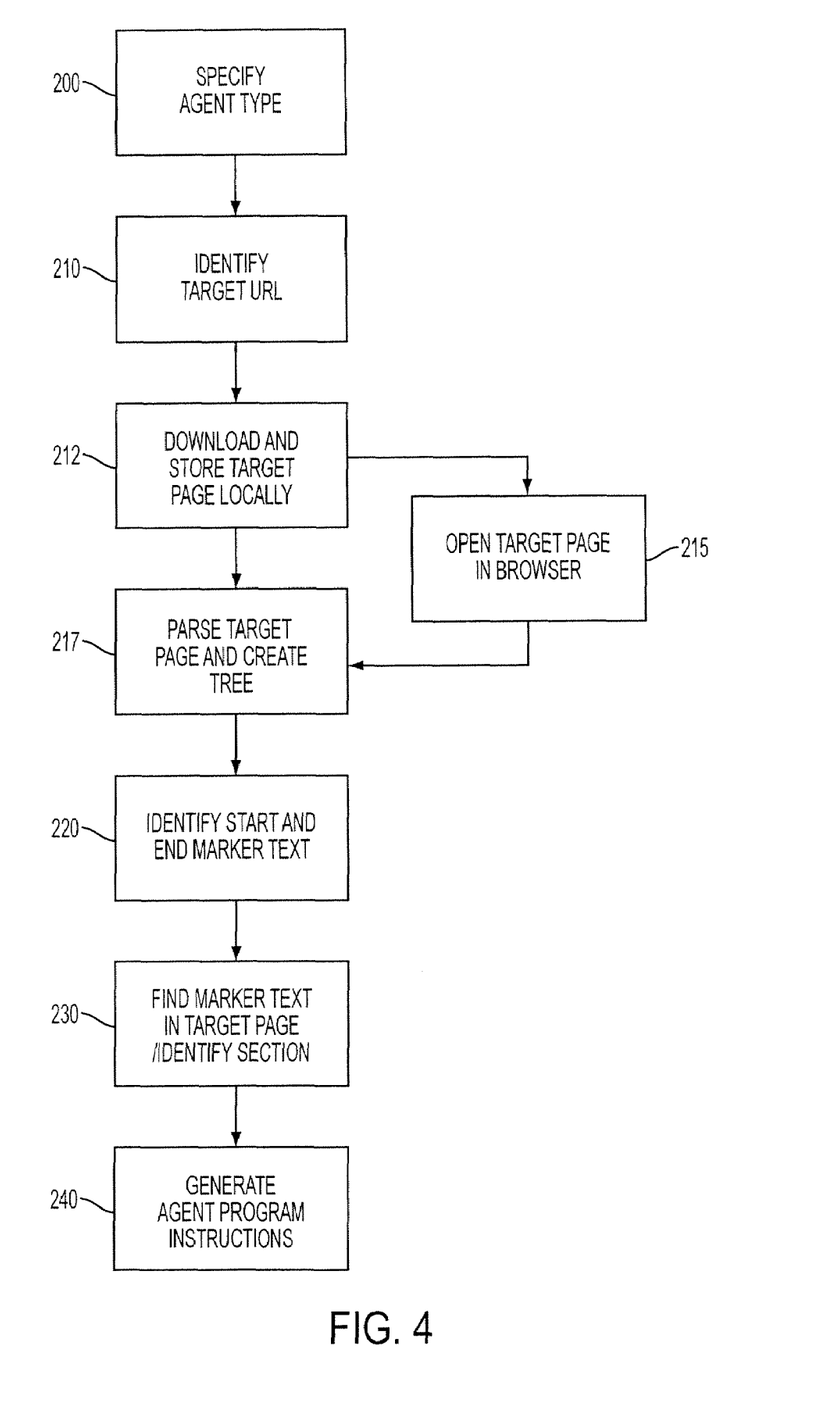
FIG. 4 is a flow chart showing the steps for creating an agent.

The steps for creating an agent 10 to retrieve information content from all or part of a known web site are displayed in the flow chart of FIG. 4. First, in an application window on the user interface 15, the agent type is specified 200 as a basic smart agent, a search agent, a custom agent or an RSS agent. The URL of the target page of the web site is identified 210 for the agent 10 using the user interface 15 and agent builder 115. Text and HTML in the target page are then downloaded and stored 212 in its entirety on the local machine.

Once the target URL is identified, optionally, the content of the target web page can be displayed 215 with the user interface 15 in a browser window for reference.

The target page is then parsed 217 by the agent builder 115 to determine the structure of the target page. The syntax and structure are analyzed and decomposed by the agent builder 115 and a parse tree is constructed. The parse tree represents all of the major structural elements found in the target web page, using well-known semantics associated with HTML syntax. The hierarchy of the original target page is determined, along with nodes that correspond to each structural element found in the target document. Plain text, links, image references and all other web page components are related to the HTML syntax elements enclosing them in the target page definition and placed into the parse tree structure as elements of the tree. It should be noted that images and non-text elements are not downloaded since they are result of separate HTTP (Hypertext Transmission Protocol) transactions different from the one required to retrieve the target web page.

In all cases, the original HTML formatting information, structural information and content from the target page are maintained in a form that allows the original version of the target page to be recreated in a functionally equivalent form.

For smart, search and custom agents, the target content of the web page is selected by a user and identified 220 for the agent in two steps. The user selects a unique text at the beginning of the target content and identifies the text for the agent 10. This text is referred to as the start marker text for the target content. Then, a second unique text near the end of the target content is selected and identified for the agent 10. This text is referred to as the end marker text.

The start and end marker text identify a section of the target web page containing content that is desired by a user. The actual text content found in that structure may change periodically; the marker texts are only used to identify the structure within the target page where the target content is initially located on the web site.

Identification 220 of the start and end marker text in the target content can occur in at least three ways. The user can identify the text by manually entering the marker text into an agent builder application window on the user interface 15, the user can cut and paste text from the target web page into the agent builder 115, or the user can select the text in the browser window displaying the target web page and direct the agent builder 115 to retrieve the selected text and use that for the input for the identification 220.

Start and end marker text may consist of plain text, stylized text, HTML syntax elements such as tags or comments, or any other text-based information contained in the target web page.

In all cases, the start and end marker text is used to identify an approximate, human readable location in the precise structure of the target web page that the agent builder 115 can use as a starting point to determine the actual physical location within the web page structure and syntax. The human readable and identifiable location may consist of a single block of content from the target page delineating the entire area of interest, or, it may consist of discontinuous areas of text to be considered the start and end markers for the area of interest.

The unique text used for the start and end marker text does not need to be precisely at the beginning or the end of the content. The agent builder 115 contains an algorithm for checking the identified text in the target page against the marker text and to determine which section or sections of the target web page are intended to be selected.

The marker text is distilled into a case-insensitive version of the text identified 220 by the user, with all unnecessary white space and intermediate formatting removed. The agent builder 115 then searches 230 the parse tree for a sequence of text-based content that matches the marker text. The marker text can span multiple nodes the parse tree and be physically separated by intervening HTML formatting tags. The agent builder 115 can reassemble the linear stream of content-oriented information from the raw HTML information using the structural information in the parse tree. The content stream is compared to the distilled marker text to ensure that the correct structure has been located 230.

As an example of the parsing, assume the following represents the structure of a simple HTML document:

```
<html>
<head><title>This is a test</title></head>
<body>
<table>
  <tr>
  <td>Tuesday, Mar. 21, 2000</td>
  <td>Headlines: New software builds agents!</td>
  </tr>
  <tr>
  <td><img src="something.gif></td>
  <td>A picture of something</td>
```

```
</table>
</body>
</html>
```

Figure 5:
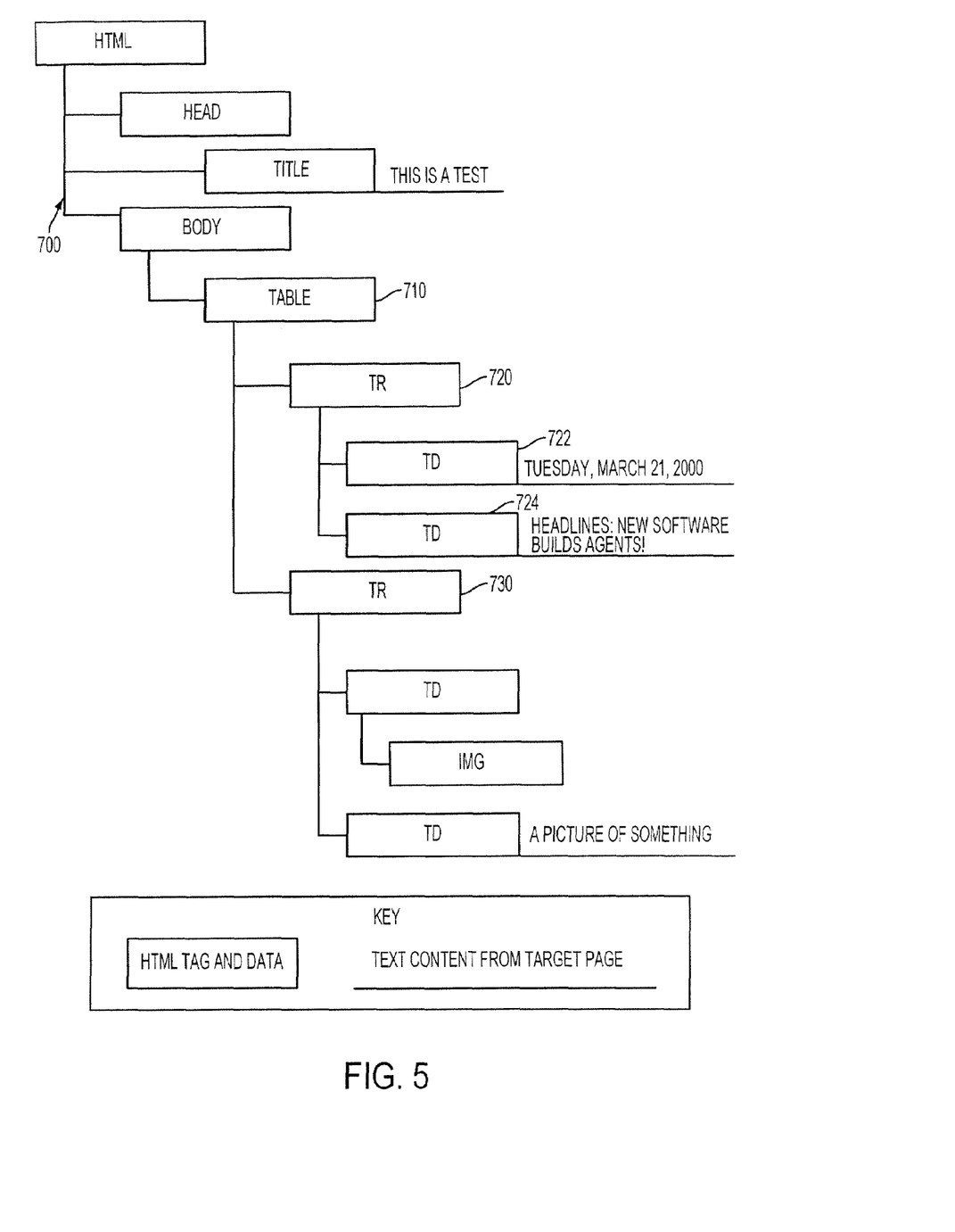
FIG. 5 is a representation of a parse tree created by an agent to describe a target page.

FIG. 5 illustrates what the resulting parse tree 700 of this structure may look like. Thus, if the user specified start marker text to be "Tuesday" and the end marker text as "Headlines", the agent builder 115 will determine location of the structures having this text in the parse tree 700. The agent builder 115 will find that the start marker text is contained in the first table 710, first row 720, first cell 722 and the end marker text is in the first table 710, first row 720, second cell 724. The agent builder 115 then determines that to construct the agent 10 for extracting a useful, syntactically correct fragment of HTML from the target page that it must extract the contents of both cells 722, 724 in the first row 720. The agent builder 115 will also extract the surrounding HTML formatting and elements to make the extracted content into a complete, stand-alone HTML entity. Thus the resulting extracted content will be a stand-alone HTML table having the following structure:

```
<table>
  <tr>
    <td>Tuesday, Mar. 21, 2000</td>
    <td>Headlines: New software builds agents!</td>
  </tr>
</table>
```

The second table row is excluded from the target content since even though it was a part of the same table, or parent object, it was outside the target object—the first row.

Once the marker text is found 230 in the target page, the structural location within the parse tree is stored. This is done for both the start and end marker text.

If the agent 10 is an RSS agent, then the start and end marker text is not necessary, because the RSS content at the target URL is intended to be taken in its entirety. The RSS content corresponds to the entire desired content and so it is not in a section of a target web page that must be identified like other non-RSS content may be. Thus, steps 220 and 230 may be skipped for RSS agents.

Returning to FIG. 4, when the start and end marker text locations have been identified in the parse tree, the agent builder 115 proceeds to automatically generate 240 the program steps that are needed to replicate the parsing and identification steps 217, 220, 230. It is thus clear that the agent builder 115 software generates an agent capable of identifying a structure containing the potentially changing target content on a fixed target URL.

The agent builder 115 moves back and forth through the parse tree hierarchy to determine a common structural element containing all of the start and end marker text. Then, program instructions are generated to identify the same location in future, changed versions of the target page. This feature permits the agent to repeatedly and accurately retrieve changing content from the same location of a target page. These instructions are combined with program instructions for automating the download, analysis and extraction steps of the agent execution process (explained below) using the foundation 100 elements. The resulting agent 10 program is stored for future execution.

Agent Operation

Figure 6:
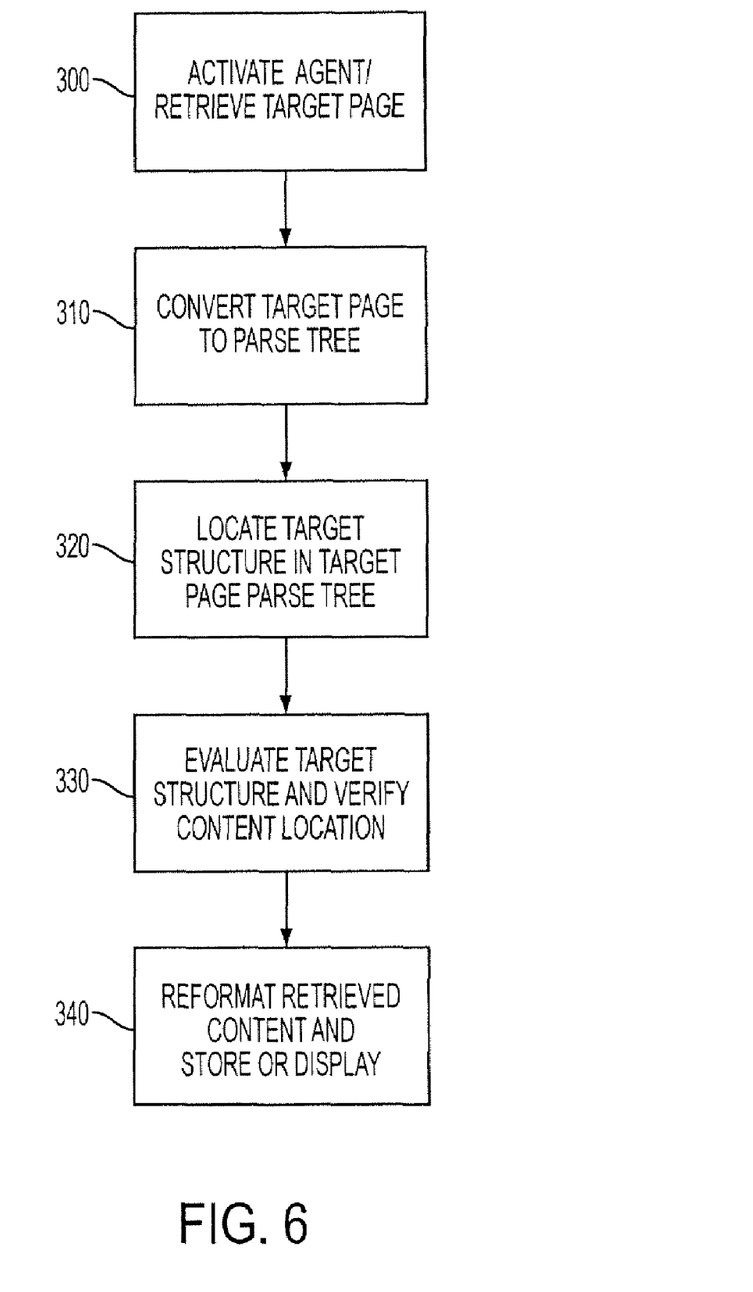
FIG. 6 is a flow chart showing the steps the agent performs when operating.

To use a constructed agent 10, a similar process to the one described above is followed. As shown in FIG. 6, first the agent 10 is activated, such as by a scheduling application or manually by a user, and the target page at the URL stored in the agent information 120 is retrieved 300. The current version of the target web page is downloaded into the memory of the local computer 5 by the agent 10. The target web page is then analyzed and converted into a parse tree representation 310.

The program instructions generated by the agent creation are used to locate 320 the structural location in the parse tree where the target content was originally found, without regard to the current content at the structural location in the current version of the web page. If the structural location is the same as when the agent 10 was first programmed, the target content will be retrieved, formatted with the surrounding HTML information and stored and/or displayed 340 for the user on the local machine 5.

When the target content is identified in the structure of a retrieved page, the content text is extracted and HTML content is regenerated around the content text based on the structure surrounding the content text in the current version of the retrieved page. The structure of the original target document that was used to create the agent 10 is only relevant to the evaluation step insofar as the original structure was used to generate the program instructions used by the agent to retrieve and evaluate the current version of the target page.

If the structural location cannot be found or has changed from the originally programmed agent information, the agent 10 can evaluate 330 the parse tree to attempt to determine the current location of the target content. The evaluation of a retrieved target page is based on a series of rules derived from the standard syntax of HTML documents. The target content area is by definition contained within some set of hierarchal HTML tags, provided that it has not been eliminated entirely from the target page. The software agent 10 embodies knowledge of these tags, their relationships, and proper syntax and semantics. The agent 10 includes algorithms using this knowledge to determine where the target content structure has been moved to within the target page.

Content Publication

A primary benefit to the agent 10 is that multiple agents 10 can be used to quickly retrieve target content from many different remote sources, all of which can then be displayed in a single application window page.

The retrieved target content is stored on the local users computer 5 in a format which is known to the software agent application 10. The retrieved target content is very simply, data, which is stored on the user's computer 5 in a standard format and can be accessed repeatedly by a display program. The data includes the content text and HTML formatting information.

One or more predefined display structures, called publication templates, can be used to arrange the stored target content into personal web pages having different formats, such as like a newspaper, web portal, etc. The publication templates are programmed with instructions for accessing particular parts of the stored target content and displaying it in a user application window, such as a browser window.

As an example, five agents are programmed to retrieve content consisting of the current news headlines and opening paragraphs of each story from five magazines and newspapers available on remote Internet web sites. A scheduling application activates the agents every hour. The five agents each executes its programmed instructions and retrieves, formats and stores the target content from each of the five news sources on the user's computer 5. After the target content is stored, the user selects a publication template which will display only the headlines from each news publication in its own section on a page in three columns. The associated first paragraph of the story, which is part of the retrieved target content but is not desired will not be displayed using the selected publication template. The template specifies where the content from each publication will begin and which components of the target content text will be displayed. The template may also display information such as the URL where the content was retrieved from, at what time (to show how up to date it is) and the content provider name.

Thus, used in combination in a single software application, the agent 10 and the publication template provide a very powerful tool for retrieving changing target content and displaying the target content in a succinct, useful manner. Such a software application can permit a user to retrieve only desired information from a target web page and screen undesirable content which is of no interest to the user. The application operates faster since it executes on the local user's computer, and only requires an Internet connection to retrieve the target content. Once the target content is retrieved, all operations occur entirely on the user's computer, with no Internet interaction being necessary.

The agent's content generation functions permit it to generate the stored output in any standard text-based format presently known. The agent includes gateway interfaces which permit the agent to communicate using standard network protocols with a wide variety of network services, such as e-mail, HTTP, FTP, etc. The agent includes translation services for converting between disparate types of formats, such as XML, HTML, and WML/WAP).

The agent software is executed at the application level of any operating system. The agent 10 is a peer application to a web browser and any other user-accessible applications, such as word processors, spreadsheets, or games. The agent 10 has the ability to act as an intermediary for the web browser software, allowing the browser to communicate with the agent 10 and the agent to act as a proxy on behalf of the browser for subsequent downstream http requests to remote URLs. The agent also acts as a server of web content to the browser on the local computer 5. The agent software is implemented entirely on the local computer 5.

While a specific embodiment of the invention has been shown and described in detail to illustrate the application of the principles of the invention, it will be understood that the invention may be embodied otherwise without departing from such principles.

What is claimed is:

1. A local computer for retrieving a changing target content from multiple target sources on a remote computer, the local computer comprising:
   a user interface for inputting information into an application window, wherein information consists of: a URL of a target source, a start and end marker text of a target content of said target source; and a structural location of the target content within target source code; an agent builder program for identifying the URL of the target source inputted by a user, and for analyzing and decomposing of said target content; and a software agent comprising program instructions for automatically retrieving a target section of said target source code irrespective of whether the target content has been moved or has changed within the target source;

the software agent for retrieving a changing target content from a first target source on a remote computer, the software agent further comprising:
   means for retrieving data from a target source on a remote computer,
   first program instructions for identifying a predefined structural location of target content located within a version of data retrieved from the first target source, said predefined structural location based upon a structural location of target content identified in a previous version of data retrieved from the target source using the agent builder program and stored as information, said first target source comprising content in addition to said target content;
   second program instructions for identifying a predefined structural location of target content located within said version of data retrieved from the first target source by evaluating the target source for the start and end market text when the target content cannot be identified by the first program instructions; and
   an agent engine for executing said first program instructions and said second program instructions to retrieve potentially changing target content from the predefined structural location in the target source; and
   third program instructions for displaying a first portion of content retrieved from the target source, the first portion consisting of the potentially changing target content from the predefined structural location in the first target source, the second program instructions further for displaying, simultaneously with the portion of content retrieved from the target source, a second portion of content retrieved from a second target source, the second target source being different from the first target source.

2. A software agent according to claim 1, wherein the data is a web page structure and the first program instructions and the second program instructions further comprise algorithms for parsing the data retrieved from the target source structure to find the target content.

3. A locally executing software applications for retrieving and arranging target content from a target source on a remote computer on to a local computer, the software applications comprising:
   a user interface application for inputting information into an application window, wherein information consists of: a URL of a target document, a start and end marker text of a target content of said target document, and a structural location of the target content within target document source code; an agent builder application for identifying the URL of the target document inputted by a user, and for analyzing and decomposing of said target content; and a software agent comprising program instructions for automatically retrieving a target section of said target document source code irrespective of whether the target content has been moved or has changed within the target document;
   a software application comprising at least one agent generated by the agent builder application having information describing a predefined structural location of a target content within a target document, the target document comprising content in addition to the target content, and an agent engine for executing first program instructions and second program instructions using the information to automatically download a dynamically changing target document from a remote computer, locate a changing target content within the target document, extract the located target content, reformat the extracted target content into a common format, and store the target content on the local computer irrespective of whether the target content has been moved or changed within the target document, first program instructions to locate the changing target content using the structural location from the target content that was defined from a previous version of the target document and second program instructions to locate the changing target content using the start and end market text when the target content is not found by first program instructions; and at least one publication template for arranging a portion of the dynamically changing target document consisting of the retrieved, stored target content for display on the local computer.

4. The software applications according to claim 3, further comprising an application display window capable of displaying the target content as arranged by the publication template.

5. The software applications according to claim 4, wherein the application display window is a web browser.

6. The software applications according to claim 3, wherein the at least one agent comprises a plurality of agents and the at least one publication template comprises a plurality of publication templates.

7. The software applications according to claim 3, further comprising the software application having scheduling means for executing the at least one agent on a periodic schedule.

8. The software applications according to claim 3, wherein the at least one agent includes parsing means for determining the location of target content within the structure of the target document.

9. The software application applications according to claim 8, wherein the parsing means comprises agent information having target content source structure information and algorithms for parsing the structure of the target document to find a target document structure containing the target content described by the agent information.

10. A method for retrieving a target content from a remote computer, the method comprising:

receiving information from a user as input to a user interface, wherein information consists of: a URL of a target document, a start and end marker text of a target content of said target document, and a structural location of a target content within target document source code;

generating, by an agent builder program, a first software agent, the first software agent comprising routines for automatically retrieving a target section of said target document using said information irrespective of whether the target content has been moved or has changed within the target document;

providing a software application having at least one autonomous agent generated by the agent builder program, wherein the at least one autonomous agent comprises the first software agent, each autonomous software agent comprising, a respective agent information, routines and an agent engine to execute the routines and apply agent information to download a dynamically changing target document from a remote computer, locate a changing target content within the target document, extract the located target content, reformat the extracted target content into a common format, and store the content on a local computer, wherein the routines of each autonomous software agent comprises a first routine that uses the structural location that was defined from a previous version of the target document and associated with the agent information to locate the changing target content and a second routing that uses the start and end marker text to locate the changing target when the target content is not found by the first routine;

executing the at least one agent on the local computer to download the target document from the remote computer and locate and extract the target content from the target document by executing the first routine and the second routine;

storing the retrieved target content on the local computer; and displaying a portion of target document, the portion consisting of the retrieved target content.

11. The method according to claim 10, further comprising displaying the stored target content on the local computer.

12. The method according to claim 11, wherein displaying the stored target content comprises providing a publication template having formatting, selecting stored content to display using the publication template formatting, and arranging the stored content according to the publication template formatting in an application window on the local computer.

13. The method according to claim 10, wherein executing the agent comprises running the at least one agent, generating with the at least one agent an instruction to retrieve at least one document identified by the target source URL to the local computer, finding the target content within the retrieved at least one document using the first routine and the second routine and copying the target content.

14. The method according to claim 13, wherein storing the retrieved target content further comprises saving the copied target content as an agent result file on the local computer.

15. The method according to claim 14, further comprising displaying the stored target content on the local computer.

16. The method according to claim 15, wherein displaying the stored target content comprises providing a publication template having formatting, selecting at least one agent result file to display using the publication template formatting, and arranging the stored content in the agent result file according to the publication template formatting in an application window on the local computer.

17. The method according to claim 16, wherein the at least one agent comprises a plurality of agents, selecting at least one agent result file comprises selecting a plurality of agent result files, the stored content in each of the plurality of agent result files being arranged according to the publication template formatting in the application window.

18. The method according to claim 13, wherein finding the target content comprises parsing the target document, and locating a structure within the parsed target document structure matching the structural location information in the agent information.

19. The method according to claim 18, wherein locating the structure comprises applying a plurality of algorithms to the parsed target document structure.

20. A method for downloading a dynamically changing target document from a remote computer to a local computer and locating and extracting a target content from the target document, the method comprising the steps of:

receiving information from a user as input into an agent builder program for automating the retrieval of dynamically changing target content;

downloading a target document from a remote computer by an agent generated by said agent builder program, and further characterized by the steps of identifying a target content within the target document, the target document comprising content in addition to the target content;

parsing the target document to determine a structural location of the target content in the target document; and storing a description of the structural location of the target content, a URL associated with the target document, and a start and end marker text of the target content as agent information;

generating, by the agent builder program, a first software agent, the software agent comprising routines for automatically retrieving a target section of said target document using said agent information irrespective of whether the target content has been moved or has changed within the target document;

downloading a subsequent version of the target document from the remote computer by said first software agent;

retrieving the target content within the subsequent version of the target document, and further characterized by the steps of: executing routines of the agent to locate and retrieve the target content by executing a first routine wherein locating and retrieving use the structural location associated with the agent information to locate the target content and a second routine wherein locating and retrieving use the start and end marker text when the target content is not found by the first routine; and displaying a portion of the subsequent version of the target document, the portion consisting of the target content.

21. The method of claim 20, wherein identifying the target content comprises providing identifying start marker text and identifying end marker text that delimits the target content in the target document.

22. The method of claim 21, wherein the start marker text and end marker text each comprise one of plain text, stylized text, and HTML syntax elements.

23. The method of claim 21, wherein the start marker text and end marker text define target content separated by non-text web page elements.

24. The method of claim 21, wherein the target content is contained in two different structures in the target source.

* * * * *